United States Patent
Pellarin et al.

(10) Patent No.: US 10,190,741 B2
(45) Date of Patent: Jan. 29, 2019

(54) LENS FOR LIGHTING DEVICE FOR MOTOR VEHICLES

(71) Applicant: VALEO VISION, Bobigny (FR)

(72) Inventors: Marie Pellarin, Courbevoie (FR); David Bourdin, Livry Gargan (FR); Stephane Andre, Gagny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/446,529

(22) Filed: Mar. 1, 2017

(65) Prior Publication Data

US 2017/0254496 A1 Sep. 7, 2017

(30) Foreign Application Priority Data

Mar. 2, 2016 (FR) ...................................... 16 51753

(51) Int. Cl.
*G02B 5/02* (2006.01)
*F21S 41/14* (2018.01)
(Continued)

(52) U.S. Cl.
CPC ............. *F21S 41/275* (2018.01); *F21S 41/14* (2018.01); *F21S 41/265* (2018.01); *G02B 5/021* (2013.01); *F21S 41/147* (2018.01); *F21S 41/255* (2018.01)

(58) Field of Classification Search
CPC .... G02B 5/021; G02B 5/0215; G02B 5/0221; G02B 5/0226; G02B 5/0231;
(Continued)

(56) References Cited

U.S. PATENT DOCUMENTS 4,796,171 A * 1/1989 Lindae ................ F21S 48/1258
362/308
5,014,173 A 5/1991 Lindae et al.
(Continued)

FOREIGN PATENT DOCUMENTS

EP 0 221 416 A2 5/1987
EP 2 578 929 A2 4/2013
(Continued)

OTHER PUBLICATIONS

French Preliminary Search Report dated Dec. 21, 2016 in French Patent Application No. 1651753 (with English translation of categories of cited documents).

*Primary Examiner* — Alexander K Garlen
(74) *Attorney, Agent, or Firm* — Oblon, McClelland, Maier & Neustadt, L.L.P.

(57) ABSTRACT

Lens for a lighting device of a motor vehicle includes a rear face designed to be oriented toward a light source of the lighting device, and a convex front face designed to be oriented toward the roadway being illuminated. The lens has a median vertical plane designed to be substantially orthogonal to the roadway, the front face having a first zone of diffusion with microstructures adapted to diffuse the light emitted by the light source, the first zone of diffusion extending in the median vertical plane. The front face furthermore includes at least two second zones of diffusion each one having microstructures adapted to diffuse the light emitted by the light source, the two second zones of diffusion being situated on either side of the median vertical plane. The microstructures of the two zones of diffusion have a depth absolutely greater than the depth of the microstructures of the first zone of diffusion.

14 Claims, 1 Drawing Sheet

(51) Int. Cl.
 *F21S 41/147* (2018.01)
 *F21S 41/255* (2018.01)
 *F21S 41/265* (2018.01)
 *F21S 41/275* (2018.01)

(58) Field of Classification Search
 CPC .. F21S 48/125; F21S 48/1275; F21S 48/1283; F21S 48/1291
 See application file for complete search history.

(56) References Cited

U.S. PATENT DOCUMENTS

| | | | | |
|---|---|---|---|---|
| 6,992,804 | B2* | 1/2006 | Lamy | F21S 48/1258 359/15 |
| 8,500,319 | B2* | 8/2013 | Wang He | F21V 5/002 362/237 |
| 2002/0093829 | A1 | 7/2002 | Pinson et al. | |
| 2010/0172146 | A1* | 7/2010 | Fischer | F21S 48/1258 362/520 |
| 2013/0021812 | A1* | 1/2013 | Schug | F21S 48/1154 362/487 |
| 2014/0003079 | A1* | 1/2014 | de Lamberterie | F21S 48/00 362/520 |
| 2014/0321145 | A1* | 10/2014 | Anzai | F21S 48/1317 362/516 |
| 2014/0334177 | A1* | 11/2014 | de Lamberterie | F21S 48/1283 362/522 |
| 2015/0241008 | A1* | 8/2015 | Matsumoto | F21S 48/125 362/516 |
| 2016/0146418 | A1 | 5/2016 | Iwasaki | |
| 2016/0327235 | A1* | 11/2016 | Khrushchev | F21V 5/008 |
| 2017/0184268 | A1* | 6/2017 | Kanayama | F21V 29/503 |

FOREIGN PATENT DOCUMENTS

| | | |
|---|---|---|
| EP | 2 578 929 A3 | 4/2013 |
| FR | 2 819 040 A1 | 7/2002 |
| FR | 2 925 656 A1 | 6/2009 |
| JP | 2013-93105 A | 5/2013 |
| WO | WO 2013/120121 A1 | 8/2013 |
| WO | WO 2014/208655 A1 | 12/2014 |

* cited by examiner

LENS FOR LIGHTING DEVICE FOR MOTOR VEHICLES

The invention pertains to the field of lenses for a lighting device for motor vehicles, and in particular for lighting devices adapted to provide low beam and high beam functions.

This type of device often comprises two light sources respectively associated with one of these functions, for example, one of the light sources being lit up when the low beam function is carried out, and both being lit up when the high beam function is carried out.

Generally this type of device furthermore comprises an element, such as a fold or a mask, configured to generate a cutoff line within the light beam generated by the device, particularly when implementing the low beam function. The configuration of the cutoff line is dictated by regulations, which for example state that the cutoff line will form a demarcation at a given light gradient between the illuminated space and the dark space above it.

One of the drawbacks of the current lighting devices is the fact that when implementing the high beam function, the cutoff in question remains clearly marked and forms a dark band between the high beams and the low beams. And this clear demarcation between the two beams is liable to disturb the driver's vision.

The invention aims to improve the situation.

Accordingly, the invention concerns a lens for a lighting device of a motor vehicle, the lens comprising a rear face designed to be oriented toward a light source of the lighting device, and a front face designed to be oriented toward the roadway being illuminated, the lens having a median vertical plane designed to be substantially orthogonal to the roadway, the front face having a first zone of diffusion with microstructures adapted to diffuse the light emitted by the light source, the first zone of diffusion extending in the median vertical plane, the front face furthermore comprising at least two second zones of diffusion each one having microstructures adapted to diffuse the light emitted by the light source, the two second zones of diffusion being situated on either side of the median vertical plane, the microstructures of the two zones of diffusion having a depth absolutely greater than the depth of the microstructures of the first zone of diffusion.

According to a first aspect of the invention, the ratio between the depth of the microstructures of the second zones of diffusion and the depth of the microstructures of the first zone of diffusion is between 1.5 and 3.

According to one aspect of the invention, the depth of the microstructures of the first zone of diffusion is between 1.5 μm and 4 μm.

According to one aspect of the invention, the depth of the microstructures of the second zones of diffusion is between 3 μm and 8 μm.

According to one aspect of the invention, the depth of the microstructures of one second zone of diffusion is absolutely greater than the depth of the microstructures of the other second zone of diffusion.

According to one aspect of the invention, within a given zone of diffusion the microstructures all have substantially the same depth.

According to one aspect of the invention, the microstructures have a maximum radius between 0.5 mm and 1 mm.

According to one aspect of the invention, the first zone of diffusion has the general shape of a band extending in the median vertical plane.

According to one aspect of the invention, the first zone of diffusion has a general circular shape.

According to one aspect of the invention, the first zone of diffusion has a width between 20% and 60% of a diameter of the lens.

According to one aspect of the invention, the front face comprises a third zone of diffusion extending substantially orthogonally to the median plane, the third zone of diffusion extending from one lower end of the first and second zones of diffusion toward an end of the front face of the lens.

According to one aspect of the invention, the third zone of diffusion has microstructures adapted to diffuse the light emitted by the light source, the microstructures of the third zone having a depth substantially identical to the depth of the microstructures of the first zone of diffusion.

According to one aspect of the invention, the first and the third zones of diffusion jointly define a connected region of diffusion on the front face of the lens.

According to one aspect of the invention, the front face has, at the level of one lower end, a region formed to divert a portion of the light coming from the light source to illuminate elevated signage.

The invention furthermore concerns a lighting device, especially for a motor vehicle, characterized in that it comprises at least one light source designed to emit light and a lens according to any one of the preceding claims, disposed to receive at least a portion of the light emitted by the light source.

According to one aspect of the invention, the lighting device comprises a first light source associated with a low beam function of the lighting device, a second light source associated with a high beam function of the lighting device, and a cutoff element adapted to generate a cutoff line within a light beam emitted by the lighting device.

The invention will be better understood by perusal of the following detailed description, given solely as an example, and making reference to the enclosed Figures, in which:

FIG. 1 illustrates a lighting device 2 according to the invention, hereinafter called the device 2.

In the context of the invention, the device 2 is advantageously a lighting device of a motor vehicle, that is, it is intended to be integrated in a motor vehicle.

Moreover, the device 2 is advantageously a front headlight.

Advantageously, the device 2 is adapted to carry out two distinct lighting functions:

a low beam function, and a high beam function.

Figure 2A:
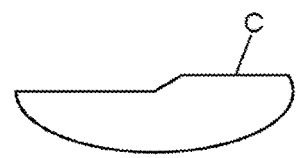
FIGS. 2a and 2b illustrate the light beams produced by the device of FIG. 1 when implementing one and the other of the two functions of the device of FIG. 1.

The light beam generated by the device 2 when implementing the low beam function is illustrated in FIG. 2a. This has, in its upper portion, a cutoff C which demarcates the zone illuminated by the beam and situated below the cutoff C from the dark zone not illuminated, which is above it.

For example, the cutoff presents a first rectilinear portion in its left part and a second rectilinear portion in its right part. The second rectilinear portion is for example situated at a different height from that of the first portion. These two portions are separated by an intermediate inclined portion.

Figure 2B:
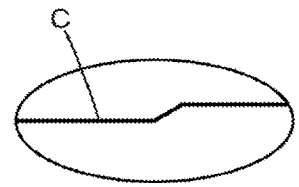

The light beam generated by the device 2 when implementing the high beam function is illustrated in FIG. 2*b*. The beam presents substantially the same configuration as in FIG. 2*a* in the lower part, and furthermore it presents an illuminated zone above the cutoff C, which thus separates the two illuminated zones.

Figure 1:
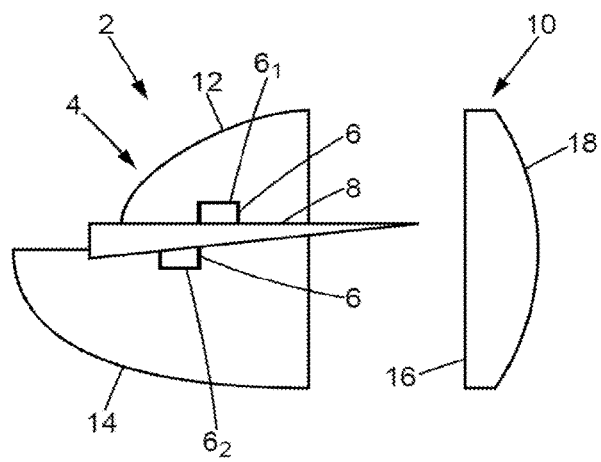
FIG. 1 is a schematic illustration of a lighting device according to the invention.

Again making reference to FIG. 1, the device 2 comprises a housing 4, at least one light source 6, an element 8 configured to generate the cutoff C, and a lens 10 according to the invention.

The housing 4 is configured to contain the light source or sources 6. It is furthermore configured to reflect the light emitted by these sources in the direction of the lens 10.

The housing 4 comprises, for example, an upper part 12 and a lower part 14, respectively associated with at least one of the two functions of the device 2. More specifically, the upper part 12 is associated with the low beam and high beam functions, and the lower part 14 is associated only with the high beam function.

The upper part 12 comprises, for example, a plurality of curved half-shells which are paired up with each other in the area of their lateral ridges, and whose respective concavities face the element 8. Each shell has for example the shape of a portion of an ellipsoid.

For example, the upper part 12 comprises three such shells.

The lower part 14 is present for example in the shape of a shell whose concavity faces the element 8 and the upper part 12 of the housing 4. This has for example the general shape of a portion of an ellipsoid.

Alternatively, the lower part 14 comprises a plurality of such shells, paired up with each other in the area of their lateral ridges, and whose respective concavities face the element 8 and the upper part 12.

The internal face of the upper 12 and lower 14 parts is configured to reflect the light emitted by the light source(s) 6.

The light source(s) 6 form the core of the light emission of the device 2.

Advantageously, the device 2 comprises two light sources 6 independent of each other.

Thus, the device 2 comprises a first light source $6_1$ associated with the low beam function and the high beam function and a second light source $6_2$ associated solely with the high beam function.

The source $6_1$ is disposed in the housing so as to emit light in the direction of the internal face of the upper part 12 of the housing 4. For example, it is disposed in the area of a focus of the shells of the upper part 12. In practice, it is disposed for example in the area of the element 8.

The source $6_2$ is disposed in the housing so as to emit light in the direction of the internal face of the lower part of the housing 4. For example, it is disposed in the area of a focus of the lower part 14.

The light sources each comprise, for example, one or more light emitting elements, such as light-emitting diodes, optionally coupled to a luminophore material designed to convert a portion of the light emitted by these elements in order to obtain a resultant light of chosen color. This resultant light is white, for example.

The element 8 is configured to generate the cutoff C in the beam produced by the device 2.

The element 8 comprises a portion forming a fold, that is, a shield reflecting in chosen manner in order to give the cutoff C the desired shape. The portion forming the fold is disposed, for example, substantially horizontally (in the direction of the orientation of FIG. 1). It is situated in the area of the front end of the element 8.

The fold has, for example, a left ridge designed to form the first rectilinear portion of the cutoff C, a right ridge offset in height with respect to the left ridge and designed to form the second rectilinear portion of the cutoff C, and an inclined intermediate ridge designed to form the inclined intermediate portion of the cutoff C.

The element 8 furthermore comprises a portion forming a support for the light source or sources 6. As illustrated in FIG. 1, this portion is situated behind the element 8, opposite the portion forming the fold, which is located in front of it.

In the example of FIG. 1, these two portions have been represented as a single piece of material. Alternatively, they are separated from each other.

Figure 3:
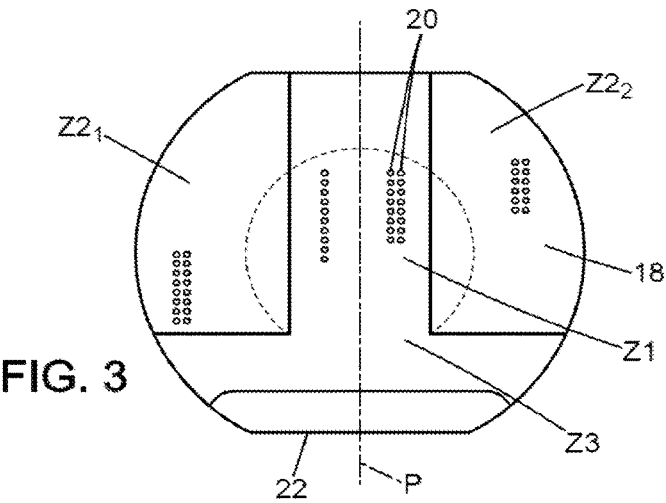
FIG. 3 is a front view of a lens according to the invention.

Making reference to FIG. 3, the lens 10 is configured to shape the light arriving at it from the sources 6 and the housing 4 in order to generate the exit beam (illustrated in FIGS. 2*a* and 2*b* according to the function which is implemented).

The lens is located in the optical path of the light furnished by the light sources after reflection on the internal faces of the housing. For example, the lens is held in a fixed position relative to the housing 4 by means of a frame (not represented).

In the context of the invention, and as described hereafter, the lens 10 is furthermore configured to blur the cutoff C, in particular when implementing the high beam function.

The lens 10 is a lens of spherical type. Advantageously, it is of convergent type. In front view, the lens presents a general circular shape. The diameter of the lens 10 (in the direction of this general circular shape) is, for example, between 35 mm and 85 mm.

The lens 10 is made of glass, for example. Alternatively, made from polymethyl methacrylate (PMMA) or of polycarbonate (PC).

The lens 10 has a substantially horizontal optical axis (in the direction of the orientation of FIG. 1). This optical axis is for example substantially at the same height as one of the ridges of the element 8, for example, its left ridge.

The lens is arranged facing the housing 4. Advantageously, it is centered with regard to the housing 4.

The lens 10 has a rear face 16 designed to be oriented toward the housing 4, and a front face 18 designed to face the roadway being illuminated.

The rear face 16 forms an entry face for the light coming into the lens 10. The rear face is planar, for example. However, alternatively, the rear face has a convex or any desired shape.

The front face 18 forms an exit face for the light. The front face 18 is convex, for example. Alternatively, it can have any desired shape. For example, in one variant it is planar.

The lens has a median plane P designed to be substantially vertical with respect to the roadway being illuminated. Here, by median plane is meant a plane which separates the right part of the lens from its left part, in particular, in front view of the lens. In the example of FIG. 3, the lens is shown in front view, the plane P being orthogonal to the plane of FIG. 3.

Optionally, as illustrated in FIG. 3, the lens 10 is substantially symmetrical with respect to this plane P. However, it is not ruled out that the lens is not symmetrical with respect to this plane.

Optionally, as illustrated in FIG. 3, the lens has an upper flat and/or a lower flat, each defining a surface which is substantially planar and substantially orthogonal to the plane P. The flats are provided, for example, to reduce the vertical footprint of the lens. For example, for a lens with a diameter of 70 mm, the flats are provided so that the height of the lens along the plane P is substantially equal to 60 mm.

In the context of the invention, the front face 18 has microstructures 20 adapted to diffuse the light passing through the lens, especially to blur the cutoff C.

Figure 4:
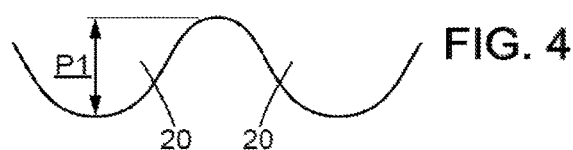
FIG. 4 illustrates a sectional view of microstructures of the lens of FIG. 3.

As illustrated in FIG. 4, by "microstructures" is meant roughness formed on the surface of the front face 18. Taking a given zone of the front face 18, this roughness can be distributed regularly, that is, the pattern defined by the peaks and valleys is regular within the given zone, or it can be distributed in an irregular manner.

These microstructures are present for example in the shape of depressions in the surface of the front face.

Advantageously, the microstructures have a mouth of substantially circular shape. The radius of this mouth forms a maximum radius of the particular microstructure. In the context of the invention, the maximum radius of the microstructures 20 is advantageously between 0.5 mm and 1 mm.

The microstructures 20 likewise have a given depth, as detailed hereafter.

Making reference to FIG. 3, the front face 18 has a first zone of diffusion Z1 comprising microstructures 20 adapted to diffuse the light coming from the sources 6, and two second zones of diffusion $Z2_1$, $Z2_2$ likewise comprising microstructures likewise adapted to diffuse the light coming from the sources 6. These microstructures in particular have the purpose of blurring the cutoff C.

The depth of the microstructures 20 of the first zone of diffusion Z1 is absolutely less than the depth of the microstructures 20 of the second zones of diffusion $Z2_1$, $Z2_2$.

More specifically, the first zone Z1 extends on the front face 18 along the median plane P. Advantageously, the plane P forms a plane of symmetry of the zone Z1.

The zone Z1 has a width (that is, a dimension transversely to the plane P) between 20% and 60% of the diameter of the lens.

Within the zone Z1, the microstructures advantageously all have substantially the same configuration, and in particular substantially the same depth.

The depth of the microstructures 20 of zone Z1 is advantageously between 1.5 μm and 4 μm.

Moreover, the microstructures are optionally distributed regularly within this zone. For example, they are regularly distributed there in a concentric fashion with regard to a given point. This point is for example the center of the front face, which is for example at mid-height of the front face 18 along the plane P. Alternatively, the spatial distribution of the microstructures 20 is not concentric. It is for example substantially a matrix, the microstructures being arranged in rows and columns. These rows and columns are for example orthogonal, or respectively parallel to the plane P. Alternatively again, their distribution within the zone Z1 is irregular.

The zone Z1 for example is in the form of a band extending in the plane P. This band for example has a general rectangular shape. The transverse edges of this band are substantially perpendicular to the plane P, the longitudinal edges being each situated on either side of the plane P symmetrically with respect to each other in regard to the plane P. The upper transverse edge of the band corresponds for example to the upper end of the front face 18. The lower transverse edge is situated for example at a distance from the upper transverse edge equal to half the length of the front face along the plane P.

In this configuration, the zones $Z2_1$ and $Z2_2$ are situated on either side of the zone Z1.

Alternatively, the zone Z1 has a general circular shape (illustrated by dotted line in FIG. 3).

Advantageously, the center of the zone Z1 is then merged with the center of concentricity of the microstructures 20 when the latter are arranged concentrically. For example, in the example of FIG. 3, this center corresponds substantially to the center of the front face. This facilitates the design of the lens inasmuch as it is then easier to ensure that no microstructure is located on the border of the zone Z1.

In certain embodiments, such as that of FIG. 3, the upper end of the zone Z1 is situated at a spacing from the upper end of the front face of the lens along the plane P. In these embodiments, the zones $Z2_1$ and $Z2_2$ border the plane P in the region of the front face situated between the upper end of the lens and the upper end of the zone Z1.

Alternatively, the upper end of the zone Z1 is situated in the area of the upper end of the front face of the lens. For example, the upper end of the zone Z1 is formed by part of the ridge bounded by the upper flat and the front face (for example, by a point of this ridge, in which case the zone Z1 is tangential to the upper end of the front face, or by a segment of this ridge).

In certain embodiments such as those of FIG. 3, the lower end of the zone Z1 is formed by a chord of the general circle shape, said chord being orthogonal to the plane P. In other words, the zone Z1 has a general circle shape whose lower end is truncated.

As described in further detail below, regardless of the shape of the zone Z1, the lower end of the zone Z1 is the limit of a third zone of diffusion.

The second zones $Z2_1$, $Z2_2$ extend on either side of the plane P. They extend advantageously as far as the lateral edges of the lens 10. Their lower end is situated for example at the same level as the lower end of the zone Z1 along the plane P. The respective shapes of these two zones are for example symmetrical with respect to each other in regard to the plane P.

In certain embodiments such as those of FIG. 3, the upper ends are situated for example at the level of the upper end of the front face, for example at the level of the upper flat. Alternatively, depending on the configuration of the zone Z1, and especially depending on its width when it has the shape of a band, this upper end may be situated away from the flat.

As previously, within the zones $Z2_1$, $Z2_2$, the microstructures 20 advantageously all have substantially the same configuration, in particular, substantially the same depth.

The depth of the microstructures 20 of the zones $Z2_1$, $Z2_2$ is advantageously between 3 and 8 μm.

Moreover, the ratio between the depth of the microstructures of the second zones of diffusion $Z2_1$, $Z2_2$ and the depth of the microstructures of the first zone of diffusion Z1 is between 1.5 and 3.

Furthermore, advantageously, the depth of the microstructures 20 of one of the zones $Z2_1$, $Z2_2$ is greater than the depth of the microstructures of the other of these zones.

Advantageously, the larger depth is observed within the zone $Z2_1$, $Z2_2$ opposite the ridge of the fold 8 located on the optical axis of the lens 10. In the example of the Figures in which the left ridge of the fold is located on the optical axis of the lens, the microstructures 20 of the zone $Z2_2$ are deeper than those of the zone $Z2_1$.

For example, in one embodiment, the depth of the microstructures 20 of the zone $Z2_1$ is 4.7 μm, that of the microstructures of the zone $Z2_2$ being substantially 5.4 μm. The depth of the microstructures of zone Z1 is then for example substantially 2.4 μm.

Like for the first zone of diffusion Z1, the microstructures of these second zones are for example regularly distributed within the zones $Z2_1$, $Z2_2$. They are arranged concentrically here, or in a matrix arrangement, or in any other regular arrangement.

Alternatively, they are not distributed here in a regular manner.

Again making reference to FIG. 3, the front face 18 advantageously comprises furthermore a third zone of diffusion Z3 extending transversely to the median plane. For example, it extends from a lateral edge of the lens up to the opposite lateral edge. Advantageously, the shape of the zone Z3 is substantially symmetrical in regard to the plane P.

The zone of diffusion Z3 has microstructures 20 adapted to diffuse the light passing through it. Advantageously, the depth of the microstructures of the zone Z3 is analogous to that of the zone Z1. Moreover, their arrangement is advantageously identical to that of the zone Z1.

The zone Z3 is adjacent to the zone Z1 and to the zones $Z2_1$, $Z2_2$. It extends from the lower end of these zones toward the lower end of the lens. Its upper end borders on the lower ends of the zones Z1, $Z2_1$, $Z2_2$. For example, this upper end extends from one side to the other of the front face, substantially orthogonally to the plane P.

The zone Z3 forms, together with the zone Z1, a connected region of diffusion of the front face. In other words, the region formed by these zones is a continuous region within which the properties of the microstructures are advantageously substantially constant.

Optionally, the front face 18 furthermore has, at the level of its lower end, a region 22 formed to divert the light arriving there in order to illuminate elevated signage.

As is known, this elevated signage corresponds to elements such as signal panels which are situated at a point higher than the beam formed by the device 2, both in the low beam and the high beam function. This region 22 is thus configured to divert a small portion of the light to illuminate these high points, for example, in directions as prescribed by regulations.

This region 22 is for example adjacent to the zone Z3, and extends between the lower end of the latter and the lower edge of the lens (optionally bounded by the lower flat).

Advantageously, the zones Z1, $Z2_1$, $Z2_2$, Z3 and 22 jointly occupy substantially the entire front face.

The mode of operation of the device 2 shall now be described with reference to the Figures.

When the sources 6 are powered by electric energy, for example from the electric energy furnished by a power supply source of the device 2 (not shown), these sources emit light toward the internal face of the corresponding part of the housing 4. This light is reflected there in the direction of the lens 10, which shapes this light. In particular, the light images the ridges of the fold 8, which is translated by the presence of the cutoff C within the light beam generated.

In low beam function, only the source $6_1$ is energized, so that the resulting beam corresponds to the one illustrated in FIG. 2a (not showing the optional zones illuminated for the elevated signage due to the presence of the region 22).

In high beam function, the sources $6_1$ and $6_2$ are both energized, the resulting beam being illustrated in FIG. 2b.

Owing to the presence of the zones of diffusion Z1, $Z2_1$, $Z2_2$, Z3, and especially the selective depth of the microstructures of these zones, in high beam function the cutoff C appears more blurred than in the devices of the prior art.

In particular, the blurring of the cutoff C is greater away from the axis than in the axis, for example, for lateral positions spaced away from the axis by more than 5° to left and right (the two positions at 5° on either side of the axis being classically termed 5° L and 5° R, (L for left, R for right).

In practice, the presence of the zones $Z2_1$ and $Z2_2$ at the sides of the front face of the lens tends to reduce the light gradient in the lateral zones of the cutoff coming from the light source associated specifically with the high beam function.

For example, in low beam function, the gradient of the cutoff is between 0.15 and 0.40 for positions situated less than 10° on either side of the axis (that is, for the positions between 10° L and 10° R).

For these same positions, the gradient of the cutoff in the high beam function is between 0.03 and 0.15.

In the devices of the prior art, the gradients are substantially identical in the two functions, high beam and low beam.

A method of fabrication of a lens 10 according to the invention shall now be described.

The lens 10 is advantageously fabricated by molding with the aid of a mold. The mold has an inner face designed to form the front face of the lens. This inner face of the mold has microstructures in a configuration which is complementary to that of the microstructures which the front face of the lens should have.

The microstructures of the mold are formed in known manner, for example. For example, for an irregular distribution of the microstructures, they are formed by sand blasting, or by electrochemical erosion. For a regular distribution of the microstructures, the microstructures of the mold are formed for example by high-speed machining of the mold.

In practice, one arranges the microstructures in the face of the mold so as to define zones which are complementary to the zones Z1 to Z3 and the region 22, and which constitute the material of the lens or a precursor of the lens so as to define these zones.

Once the lens has been stripped from the mold, it is subjected to optional known treatments, for example.

The lens according to the invention has several advantages.

In fact, it makes it possible to reduce the risk which the presence of the cutoff C is liable to create for the driver, especially in high beam function, and in particular to reduce the nuisance caused by this cutoff in the area of the lateral ends of the beam which is generated, and which are the most likely to cause problems.

Moreover, this result is obtained in simple manner, not requiring major modifications to the lighting device, especially its geometrical configuration.

In the description above, the device 2 has been described as comprising a housing 4 having reflective surfaces configured to reflect the light emitted by the sources in the direction of the lens 10.

In an alternative configuration, the device 2 has no housing 4 with internal reflecting faces.

The device 2 then comprises a support on which the sources 6 are arranged. The support is arranged for example behind the element 8 and orthogonally to the optical axis of the lens. The sources $6_1$ and $6_2$ are arranged above and below the optical axis.

The device further comprises, for each source, a shaping optical element arranged opposite the corresponding source and configured to focus the light emitted by the corresponding source on the fold of the element 8.

The relative configuration of the fold and the lens remains unchanged, for example.

The invention claimed is:

1. A lens for a lighting device of a motor vehicle, the lens comprising:
   a rear face designed to be oriented toward a light source of the lighting device;
   a front face designed to be oriented toward the roadway being illuminated; and
   a median vertical plane designed to be substantially orthogonal to the roadway, the front face having a first zone of diffusion with microstructures adapted to diffuse the light emitted by the light source, the first zone of diffusion extending in the median vertical plane, the front face including at least two second zones of diffusion, each one of the at least two second zones of diffusion having microstructures adapted to diffuse the light emitted by the light source, the at least two second zones of diffusion being situated on either side of the median vertical plane, the microstructures of the at least two second zones of diffusion having a depth greater than a depth of the microstructures of the first zone of diffusion, wherein
   the front face includes a third zone of diffusion extending substantially orthogonally to the median plane, the third zone of diffusion extending from one lower end of both the first zone of diffusion and the at least two second zones of diffusion toward an end of the front face of the lens, and
   the third zone of diffusion has microstructures adapted to diffuse the light emitted by the light source, the microstructures of the third zone having a depth substantially identical to the depth of the microstructures of the first zone of diffusion.

2. The lens according to claim 1, wherein the ratio between the depth of the microstructures of the at least two second zones of diffusion and the depth of the microstructures of the first zone of diffusion is between 1.5 and 3.

3. The lens according to claim 1, wherein the depth of the microstructures of the first zone of diffusion is between 1.5 µm and 4 µm.

4. The lens according to claim 1, wherein the depth of the microstructures of the at least two second zones of diffusion is between 3 µm and 8 µm.

5. The lens according to claim 1, wherein the at least two second zones of diffusion are two second zones of diffusion and a depth of the microstructures of one of the two second zones of diffusion is greater than a depth of the microstructures of the other one of the second zones of diffusion.

6. The lens according to claim 1, wherein within a given zone of diffusion the microstructures of the first zone of diffusion and the microstructures of the at least two second zones of diffusion all have substantially a same depth.

7. The lens according to claim 1, wherein the microstructures of the first zone of diffusion and the microstructures of the at least two second zones of diffusion have a maximum radius between 0.5 mm and 1 mm.

8. The lens according to claim 1, wherein the first zone of diffusion has the general shape of a band extending in the median vertical plane.

9. The lens according to claim 1, wherein the first zone of diffusion has a general circular shape.

10. The lens according to claim 1, wherein the first zone of diffusion has a width between 20% and 60% of a diameter of the lens.

11. The lens according to claim 1, wherein the first and the third zones of diffusion jointly define a connected region of diffusion on the front face of the lens.

12. The lens according to claim 1, wherein the front face has, at the level of one lower end, a region formed to divert a portion of the light coming from the light source to illuminate elevated signage.

13. A lighting device, for a motor vehicle, comprising:
   at least one light source designed to emit light and the lens according to claim 1, disposed to receive at least a portion of the light emitted by the light source.

14. The lighting device according to claim 13, wherein the at least one light source includes a first light source associated with a low beam function of the lighting device, a second light source associated with a high beam function of the lighting device, and the lighting device further comprises a cutoff element adapted to generate a cutoff line within a light beam emitted by the lighting device.

* * * * *